US005565889A

United States Patent [19]
Crooks et al.

[11] Patent Number: 5,565,889
[45] Date of Patent: Oct. 15, 1996

[54] POINTING DEVICES FOR A PORTABLE COMPUTER

[75] Inventors: Cynthia A. Crooks, Houston; Michael W. Ambrose, Cypress; Stephan A. Mato, Jr., Katy; Gopal C. Bhagat, Houston, all of Tex.

[73] Assignee: Compaq Computer Corporation, Houston, Tex.

[21] Appl. No.: 269,967

[22] Filed: Jun. 30, 1994

Related U.S. Application Data

[60] Continuation of Ser. No. 25,071, Mar. 2, 1993, abandoned, which is a division of Ser. No. 885,121, May 18, 1992, Pat. No. 5,208,736.

[51] Int. Cl.$^6$ .................................................. G09G 5/08
[52] U.S. Cl. ............................................ 345/157; 345/167
[58] Field of Search .................................. 345/157, 160, 345/163, 169; 400/682; D14/160; 364/709.01, 709.02; 341/20–22

[56] References Cited

U.S. PATENT DOCUMENTS

| 4,562,347 | 12/1985 | Hovey et al. | 250/221 |
|---|---|---|---|
| 4,633,167 | 12/1986 | Kitts | 345/156 |
| 4,773,783 | 9/1988 | Dickie | 400/682 |
| 4,866,602 | 9/1989 | Hall | 364/200 |
| 4,891,632 | 1/1990 | Chang | 340/710 |
| 4,913,387 | 4/1990 | Tice | 248/918 |
| 4,917,516 | 4/1990 | Retter | 400/489 |
| 5,008,528 | 4/1991 | Duchon | 250/221 |
| 5,088,070 | 2/1992 | Shiff | 340/706 |
| 5,162,780 | 11/1992 | Solhjell | 345/167 |
| 5,202,817 | 4/1993 | Koenck et al. | 364/708 |
| 5,208,736 | 5/1993 | Crooks et al. | 361/393 |
| 5,428,355 | 6/1995 | Jondrow et al. | 345/168 |

FOREIGN PATENT DOCUMENTS

| 0405504 | 2/1991 | European Pat. Off. | 340/798 |
|---|---|---|---|
| 0477098A3 | 3/1992 | European Pat. Off. | G06K 11/18 |
| 2244546 | 4/1991 | United Kingdom | G05G 9/04 |
| WO91/09363 | 6/1991 | WIPO | G06F 3/033 |

OTHER PUBLICATIONS

"Hand-Held Data Input Device" IBM Technical Disclosure Bulletin vol. 26 No. 11, Apr. 1984.
"IBM Dictionary of Computing" 1994, p. 698.
"The Ultimate In-board Pointing Device, VersaPoint™ Micro Joystick Integration Guide, *A VersaPoint™ Technology*", published by Interlink Electronics of Camarillo, California, Oct. 1993, (11 pgs. total) (Note in first line of paragraph 1.0 reference to patented).
"J-Mouse for your notebook computer", © Copyright 1991 Home Row, Inc. (Notice: "Patents issued and pending worldwide." on bottom on p. 2), (cover page, pp. 1–2 and 5; 4 pgs.
"GlidePoint Technical Specifications" published by Cirque Corporation of Salt Lake City, Utah, (Notice: GlidePoint's advanced Field Distortion Sensing Technology (Patent Pending)... p. 5), (cover page, pp. 3–5 and 10; 5 pgs. total).
Complete logitech Trackman® Portable product with packaging and documents including, but not limited to, below AA, BB, CC and DD.

(List continued on next page.)

*Primary Examiner*—Ulysses Weldon
*Assistant Examiner*—Amare Mengistu
*Attorney, Agent, or Firm*—Pravel, Hewitt, Kimball & Krieger

[57] ABSTRACT

A pointing device according to the present invention includes a trackball embedded in the case of a computer display. The trackball is placed adjacent to the display and the select buttons for the trackball are located on the backside of the display case behind the trackball. The user guides the trackball with his thumb and pushes the select buttons on the backside of the case with his index and middle fingers, allowing the user to operate the pointing device with only one hand. Alternatively, the trackball is embedded in the corner of the keyboard of a desktop system, with the select buttons on the opposite side of the keyboard behind the trackball. With the keyboard standing on legs, the user's fingers can reach the two select buttons opposite the trackball to operating the pointing device.

20 Claims, 4 Drawing Sheets

OTHER PUBLICATIONS

"Logitech Getting Started For Trackman® Portable", © 1991 by Logitech, Inc., Fremont, Ca 94555 (33 pages total, including cover pages).

"Logitech Trackman® Portable" packaging, © 1991 Logitech, Inc., Freemont, Ca. (2 pages total–front and back of box).

Thumbelina Guide to Operations, PC and Portable Versions, Version 3.0, © Appoint 1989, 1990, 1991, 1992 (21 pages total including cover pages).

Microsoft® Ballpoint Mouse brochure entitled "Three steps and you're ready to roll", © 1991 Microsoft Corporation (Note "U.S. Patent 4,666,602 and patent pending" on brochure) (1 page total).

Microsoft® BallPoint Mouse User's Guide, Version 8.20, ©Copyright Microsoft Corporation, 1984–1992 (64 pages total including cover pages).

Microsoft® BallPoint Mouse Packaging, ®1992 Microsoft Corporation (2 pages total – front and back of box).

PC Magazine, Jun. 16, 1992, vol. 11, No. 11; Front Cover Page, pp. 10, 365–368. (six pages total).

PC Week, Feb. 24, 1992, vol. 9, No. 8; Front Cover Page, pp. 88–89 (fold outs) (five pages total).

PC Week, Apr. 20, 1992, vol. 9, No. 16; Front Cover Page, pp. 74–75 (foldouts) (five pages total).

"Traveling Companions", *PC World*, vol. 10, No. 2, Feb. 1992, pp. 182–189 (San Francisco, Ca.) (10 pages total).

Texas Instrument Advertisement, *PC Magazine*, vol. 11, No. 7, Apr. 14, 1992, p. 157 (New York, New York) (3 pages total).

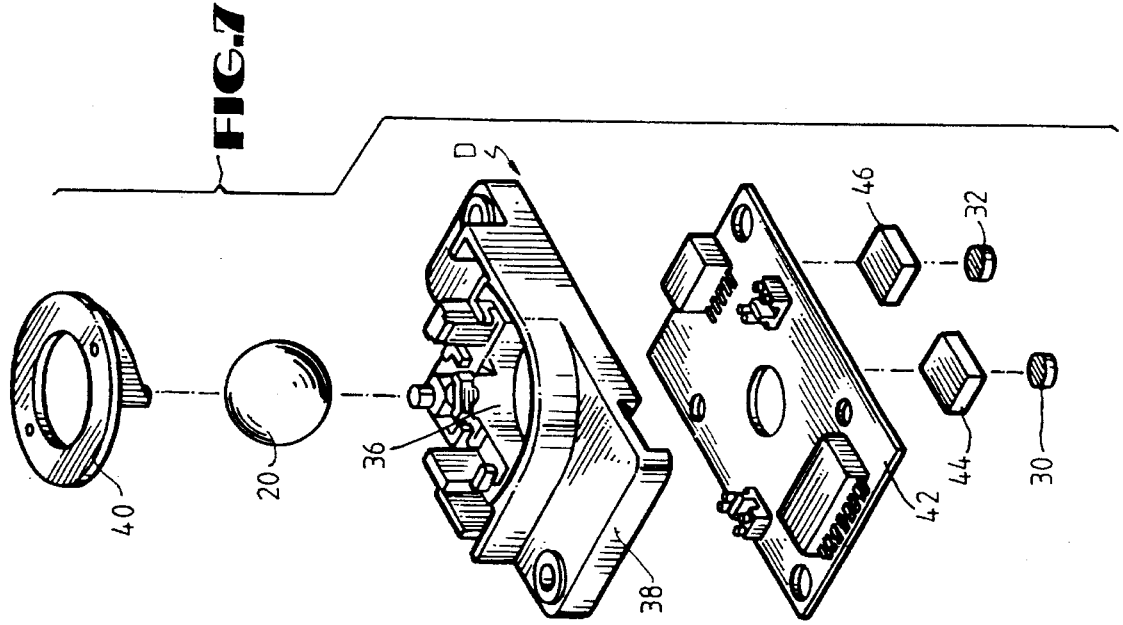
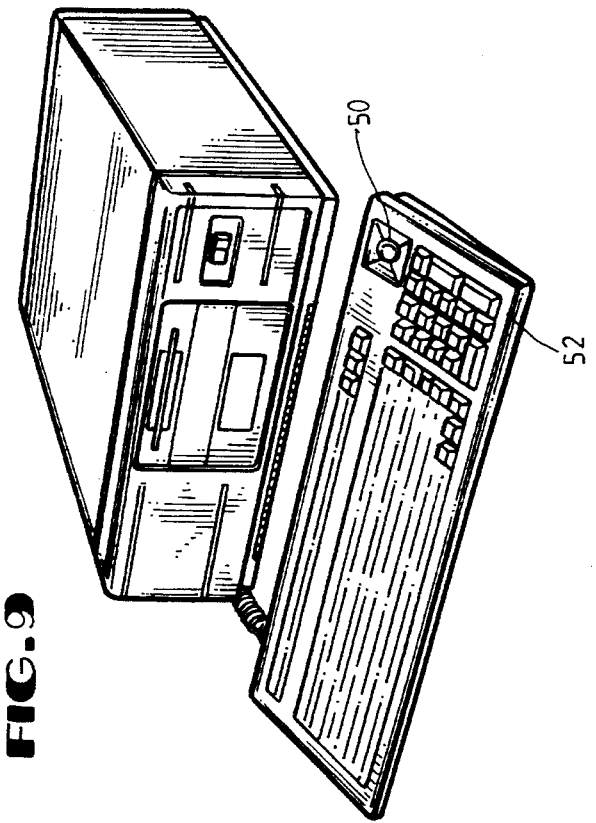

POINTING DEVICES FOR A PORTABLE COMPUTER

This is a continuation of application Ser. No. 08/025,071 filed on Mar. 2, 1993, now abandoned, and which is a divisional of Ser. No. 07/885,121 filed on May 18, 1992 which was issued on May 4, 1993 as U.S. Pat. No. 5,208, 736.

BACKGROUND OF THE INVENTION

1. Field of the Invention

The invention generally relates to pointing devices used with computer systems, and more particularly, to a trackball for use with portable computers and capable of being embedded in portions of the computer.

2. Description of the Related Art

The tremendous growth of the computer industry in recent years has been accompanied by advances in both computer hardware and software. Computers have become more convenient to use and so affordable that many individuals now own personal computers. As computer systems have developed to become more accessible to personal users, software has also evolved into complex programs that are simple for a relatively untrained user to operate. To maximize user comfort and familiarity, much of the current software is graphics oriented, using icons and pointers to allow the user to choose a desired application.

Pointing devices provide a simple interface between users and graphics oriented applications, allowing the user to indicate what he wants by merely pointing to it on the display. A user can initiate a program by simply moving the cursor to the desired option and pressing a select button. As the program runs, it provides the user with more options represented on the display of the computer, and the user directs the execution of the program using the pointing device.

For desktop computers, a mouse is the most common pointing device, as it is reliable and easy to use. A mouse is a device moved about a flat surface while the cursor on the display follows the movement of the mouse. In many mice a ball located on the bottom of the unit is in contact with the desktop or a mouse pad and rolls when the mouse is moved. This rolling is converted into X and Y values and provided to the computer. In addition, mice have one, two or three buttons for indicating user selection. The buttons are typically located on the top side of the mouse.

Other pointing devices include trackballs, which are essentially mice with the ball and buttons facing upward; digitizing pads; force sensitive keys; and touch screens. Most of these items are generally not integral parts of the computer, but are made by other manufacturers to be used in conjunction with the computer system. As a result, most pointing devices comprise separate units apart from the computer system.

Consequently, a mouse or other common pointing device is not particularly well suited to a portable computer. Powerful systems are now available in portable units no larger than a thick notebook and can operate in almost any environment. But for portable systems, such as laptop and notebook computers, any extra equipment that has to be carried with the computer decreases the system's portability. Ideally, the user would only have to transport the computer itself. A conventional mouse, however, is a relatively large device, employs a long cord, requires a surface on which to roll, and is not an integrated part of the computer. Other pointing devices share these and other problems.

The shortcomings of pointing devices in a portable system have usually been addressed by using trackball devices. The device's size has been reduced and the cable shortened to improve the device's compatibility with a portable system. To use the device, it is usually attached to the side of the computer case next to the keyboard, and plugged into a connector at the back of the computer during operation. The size of these devices has been reduced. Although these improvements are helpful, they only reduce the problems associated with a mouse or trackball without eliminating them. A smaller mouse with a shorter cord still needs a relatively wide, flat area to operate, and a trackball clamped to the side of the computer remains a hindrance that must be carried with the computer and generally disconnected for travel.

Several computer systems used embedded pointing devices. Computer keyboards are available which use a miniature trackball mounted in one corner, with the trackball and the buttons facing upwardly. Another keyboard embedded pointing device is a small touch pad located at one end of the keyboard. In its Powerbook series of laptop computers, Apple Corporation has mounted a trackball and two arc-shaped buttons below the space bar on the keyboard. An alternative design used in some portable computers is the Isopoint (TM) unit. The Isopoint design is basically a cylinder which rotates axially and slides longitudinally, the cylinder mounted below the space bar. Buttons flank the cylinder or the entire cylinder can be depressed. In yet another variation, one manufacturer is providing a "wobble key." One special key on the keyboard is designed so that it not only can be depressed, but also can be moved or pivoted in four directions, thus providing X and Y movement. The Apple and Isopoint designs have the problem of requiring increased space below the keyboard, an area already highly cramped in notebook computers. The wobble key requires a very complicated key and is not necessarily highly sensitive or intuitive. Conventional integrated designs also occupy relatively large amounts of space because of the ball and buttons being accessible from only one side.

Thus the known pointing devices are either too large and cumbersome for use if not integrated, require undesirably large amounts of space in integrated designs or are simply not considered sufficiently accurate and usable.

SUMMARY OF THE INVENTION

A pointing device according to the present invention permits the user to operate an intuitively simple pointing device comfortably, with the device being integrated with the computer and yet not enlarging the size of the computer. In the preferred embodiment, a trackball is embedded in the housing of the display. The trackball is placed adjacent to the display and facing the user, preferably near the lower right hand corner, and the select buttons for the pointing device are located on the backside of the display housing behind the trackball. To use the pointing device, the user guides the trackball with his thumb and pushes the select buttons on the backside of the housing with his index and middle fingers. In addition, because the user's hand is in a natural position as if it were lightly gripping the side of the display case, a pointing device according to the present invention offers improved accuracy and simplicity to the user. Because the user's hand can rest on the side of the base section, the placement of the pointing device in the display part of the case further reduces the discomfort and fatigue suffered by the user. In addition, with the trackball closer to the display and oriented in the same plane as the cursor, movement of the trackball correlates more intuitively to the movement of the cursor. Locating the trackball in the display section of the computer further eliminates the need to make room for the pointing device in the already crowded base section of a laptop or notebook computer. Unlike a separate mouse or trackball, the embedded pointing device also eliminates the extra piece of hardware to be carried with the computer and requires no space for manipulation.

In an alternative embodiment, a trackball is embedded in the keyboard section of a desktop system. Preferably, the trackball is embedded in the top side and upper right hand corner of the keyboard, with the select buttons on the opposite or bottom side of the keyboard behind the trackball. With the keyboard standing on its legs, the user's fingers can reach the two select buttons opposite the trackball to operate the pointing device. Like the portable computer embodiment, this design improves user comfort and maximizes the useability of the pointing device.

BRIEF DESCRIPTION OF THE DRAWINGS

A better understanding of the invention can be obtained when the description of the preferred embodiment is considered in conjunction with the following drawings, in which:

FIG. 7 is an exploded view of a trackball pointing device having two select buttons mounted on the underside of the circuit board;

FIG. 9 is a perspective view of a desktop computer and keyboard incorporating the present invention; and FIG. 10 is a side view in partial cutaway of the keyboard shown in FIG. 9.

DETAILED DESCRIPTION OF THE PREFERRED EMBODIMENT

Figure 1:
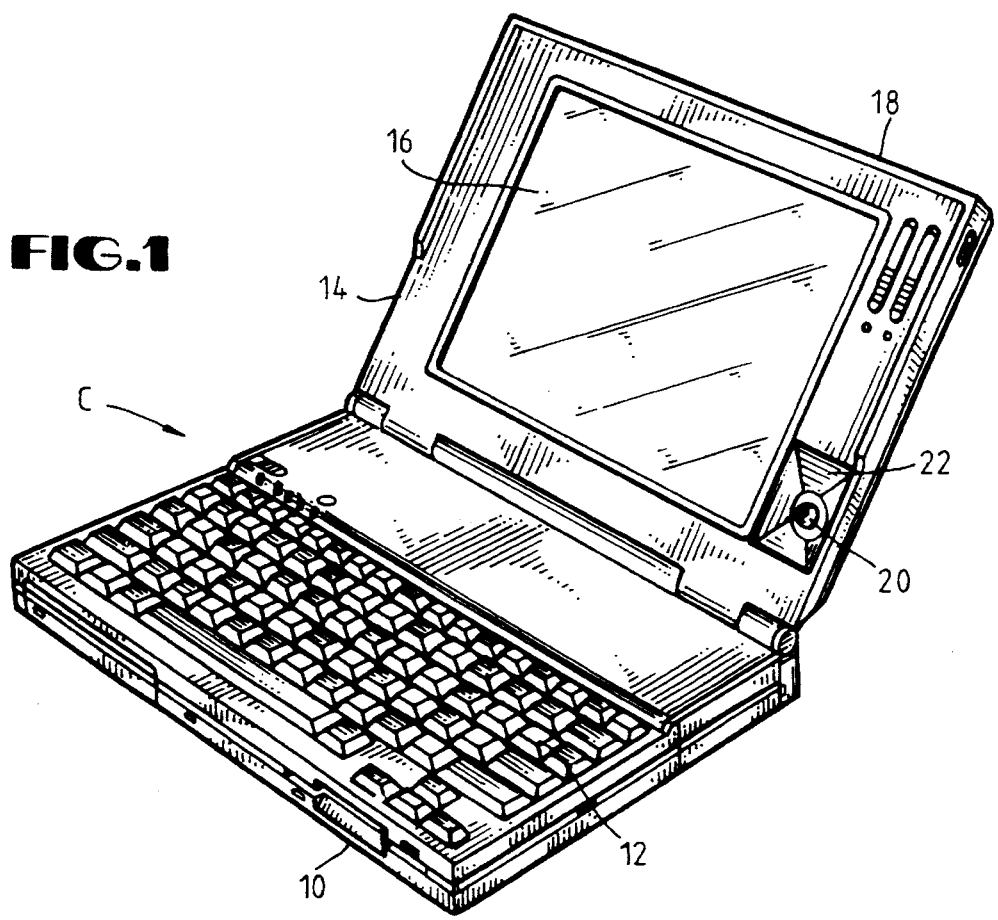
FIG. 1 is a perspective view of a notebook computer incorporating the present invention.
Figure 2:
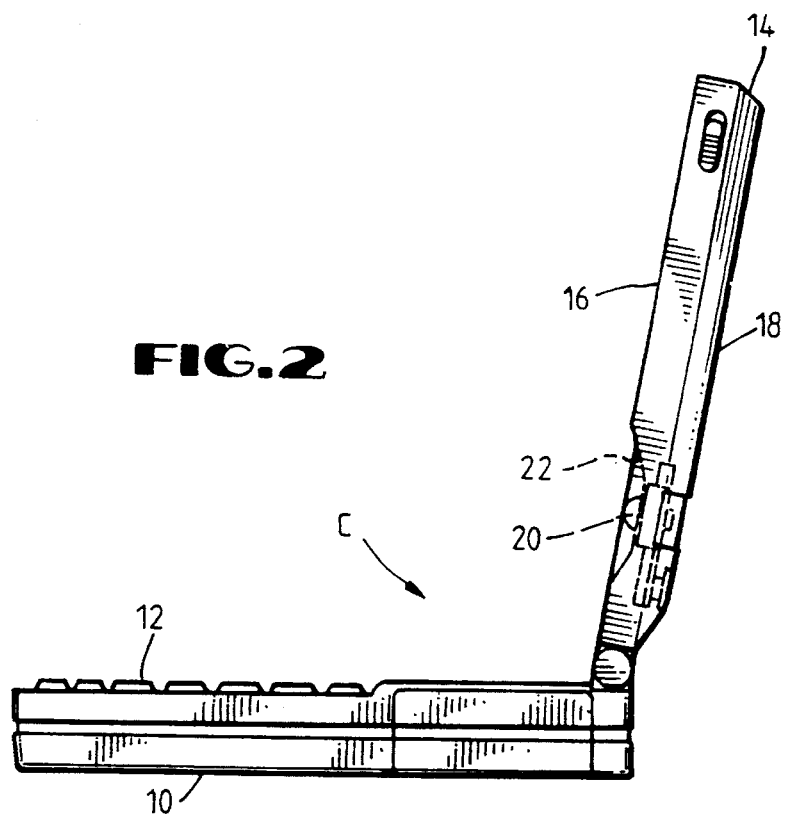
FIG. 2 is a side view of the computer of FIG. 1.

Referring now to FIGS. 1 and 2, a portable computer system C, like a notebook or laptop computer incorporating the present invention is shown. The portable computer C includes all of the capabilities and features of a desktop unit. Portable computers, however, are relatively light and compact, and can operate using rechargeable batteries. The portable computer C generally comprises two sections which are hinged together on one side. A base section 10 includes a keyboard 12 and most of the computer system components and the power supply circuitry, including the rechargeable batteries. Floppy and fixed disk drives and peripheral ports are also located in the base section 10. The top section 14, on the other hand, includes a generally parallelepiped-shaped housing 18 which contains a display 16 visible through an opening in the housing 18 and display control circuitry. Because the display 16 is generally a liquid crystal display (LCD), backlighting is required to provide a contrasting background for the darker images on the display 16. Thus, the top section 14 also includes backlighting circuitry to generate light behind the display 16. The display 16 and the other components are encased in a rigid plastic housing 18 joined to the base section 10 of the computer C. The computer C opens so that the display 16 stands generally upright while the base section 10 rests flat on a surface.

The top section 14 further includes a trackball 20 embedded in the housing 18 of the top section 14. Moving the trackball 20 causes the cursor to move about the display in the same direction as the trackball's motion and at a proportional speed. A shallow recess 22 is formed in the front of the housing 18 near the display 16, and the trackball 20 is placed in the deepest part of the recess 22. The recess 22 is deep enough to prevent the trackball 20 from protruding beyond the plane of the display 16, allowing the computer C to fold together without hindrance from the trackball 20. Optimally, the trackball 20 is the width of an ordinary hand from the bottom of the display housing 18 and the length of an ordinary thumb from the side. At this location, the trackball 20 is positioned where the ordinary user's thumb would naturally be with his hand resting on the base section 10 and wrapped around the top section 14. The trackball 20, described in further detail below, rolls relatively freely within a socket 36 (FIG. 7) behind the recess 22, and is held in the socket by a retaining ring 40.

Figure 4:
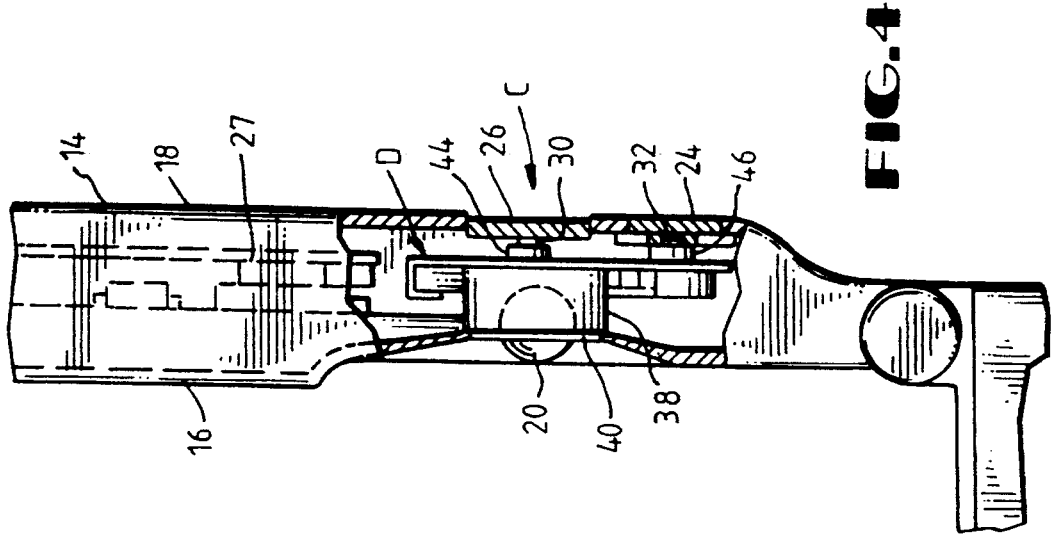
FIG. 4 is a partial side view of the computer of FIG. 3 showing the position of two select buttons, hidden from view, on the backside of the display case taken along the line 4—4.
Figure 3:
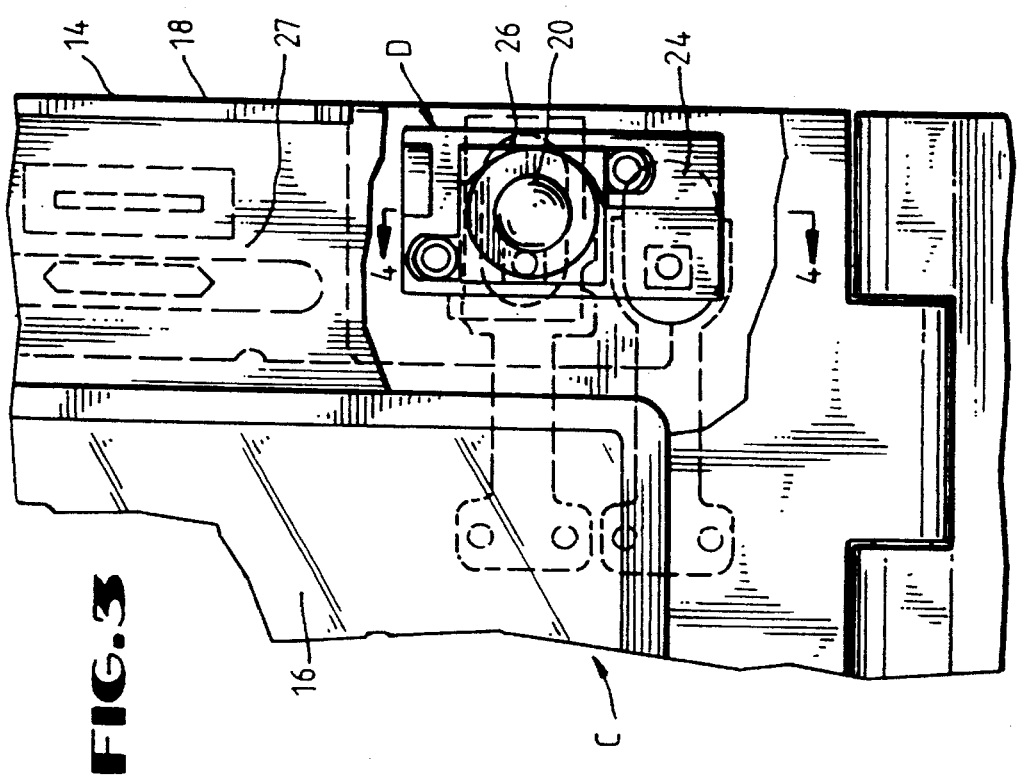
FIG. 3 is a partial front view in partial cutaway of the notebook computer of FIG. 1.
Figure 5:
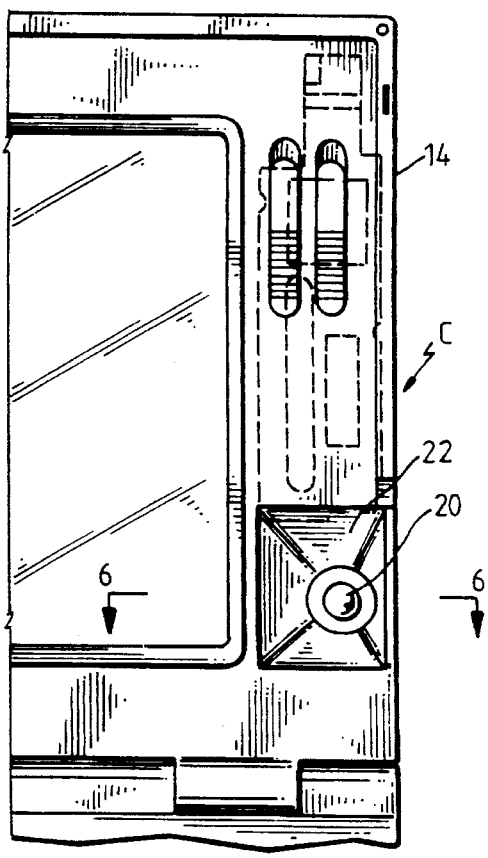
FIG. 5 is a partial front view of the notebook computer of FIG. 1.

Referring now to FIGS. 3 and 4, the portable computer C further includes two select buttons 24, 26 for designating particular points on the display and providing various other information to the system, generally duplicating the buttons found on two button mice. The exact function of the select buttons 24, 26 depends upon the program being executed. The select buttons 24, 26 are placed on the backside of the display housing 18, opposite the display 16, and one select button 26 is located directly behind the trackball 20. Thus, the trackball 20 is positioned so that the user's thumb can rest on the trackball 20, while his hand wraps around the outside of the display housing 18 and his index and middle fingers rest on the two select buttons 24, 26, respectively. To prevent damage to the buttons 24, 26 during transport and for aesthetic purposes, the buttons 24, 26 are mounted so that their outside surfaces are flush with or recessed below the outside of the top section 14.

It should also be noted that the trackball 20 and the select buttons 24, 26 can be located anywhere along the outside of the display housing 18. The top section 14 generally includes, however, display backlighting circuitry 27 which generates significant electromagnetic noise which can adversely affect the operation of an unshielded pointing device. Consequently, the pointing device and its connecting wires must be electromagnetically shielded to prevent interference.

Figure 6:
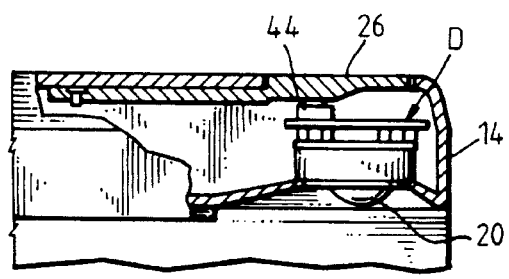
FIG. 6 is a view in partial cross section of the trackball and buttons of the notebook computer of FIG. 5, taken along the line 6—6.

Referring to FIG. 6, a top view similar to FIG. 4 is provided. The trackball 20 is shown to be not centered between the display 16 and the edge of the top section 14 but is located closer to the edge of the top section 14.

Referring now to FIG. 7, a trackball pointing device D of the preferred embodiment is shown having two select buttons 30, 32 mounted opposite a trackball 20. The trackball 20 can be rolled in any direction and the cursor moves correspondingly on the display. In the preferred embodiment, the pointing device D employs an optical trackball, as opposed to a mechanical trackball. The pointing device includes the trackball 20 mounted within a socket 36 formed in a receiving plate 38, and is held in place by a retaining ring 40 which is held over the top of the trackball 20 and attached to the socket to prevent the trackball 20 from falling out of the socket 36. Preferably, the trackball 20 is eleven millimeters in diameter, suitable for movement by the user's thumb. Inside the socket 36, the receiving plate 38 includes four rollers (not shown) on which the trackball 20 rests. When the trackball 20 is moved, the rollers rotate. The ends of two of the rollers are parts of separate optical systems to determine how fast and how far the trackball 20 rolls on each roller. From this information, the vertical and horizontal direction and speed of the cursor's intended movement can be determined and provided to the graphics software.

The receiving plate 38 for the trackball 20 is attached to a circuit board 42. The circuit board 42 includes all of the circuitry required to detect movement of the rollers caused by the trackball 20 and provide the data to the pointing device input of the computer C. On the opposite side of the circuit board 42, the select buttons 30, 32 are positioned within switches 44, 46 attached to the underside of the circuit board 42. Each switch 44, 46 is connected to the circuitry mounted on the circuit board 42 to allow the user to designate specific cursor locations on the display and interact with the system. The select button 30 is received by a mating location in select button 26, while select button 32 is received by a mating location in select button 24. Thus depressing select button 26 activates switch 44 and depressing select button 24 activates switch 46.

Figure 8:
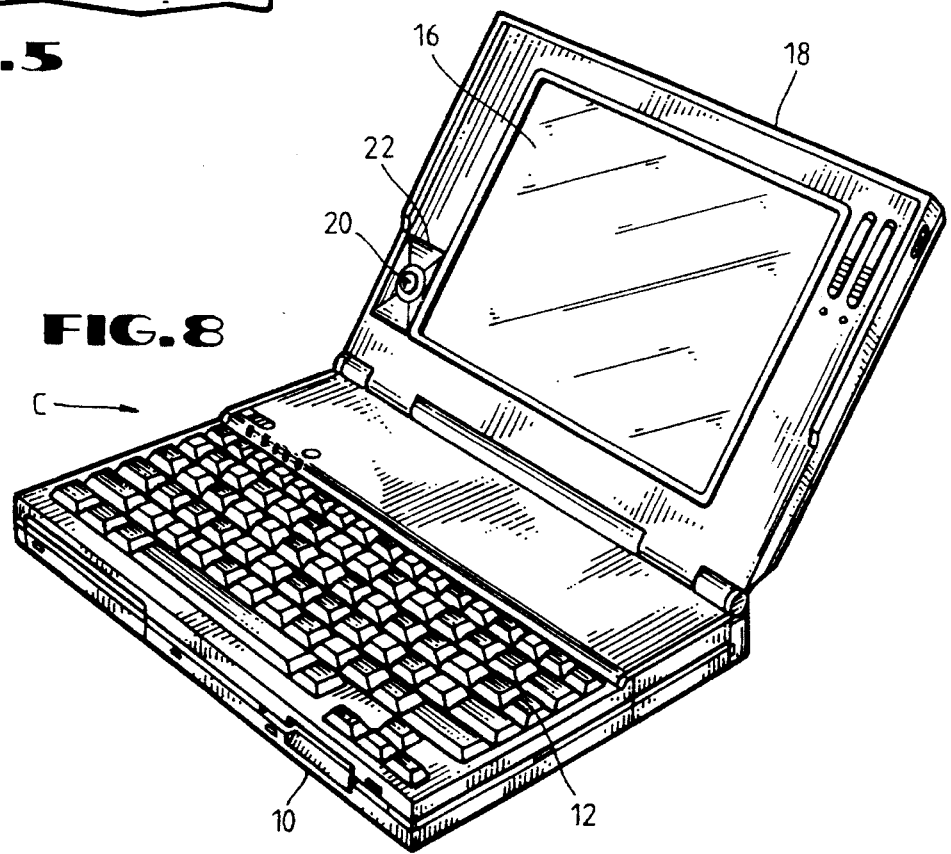
FIG. 8 is a perspective view of a notebook computer similar to that of FIG. 1, but having the pointing device located to the left of the display.

The preferred embodiment can easily be adapted to suit a left-handed user. As shown in FIG. 8, the portable computer C can simply be designed with the trackball 20 in the lower left corner, with the select buttons 24, 26 located directly behind it. In an alternative embodiment, the pointing device is a removable module that can be placed, at the user's choice, on either the left side or the right side of the display housing. To change the system, a left-handed user removes a panel from the left side of the display case, disengages the pointing device from its position on the right side of the display housing, and exchanges the positions of the two pieces. The system is designed to respond to the trackball 20 in either location.

Placing the trackball 20 near the display 16 offers several advantages. For graphics oriented software, easy and natural use of the pointing device is an important feature of the computer C. On the other hand, although a mouse is simple and easy to use, it is a nuisance and impractical for portable computers. Embedding the trackball 20 in the top section 14 provides a practical substitute for a mouse without a separate piece of hardware or the need for extra space. In addition, the trackball 20 is oriented in the same plane as the plane in which the cursor moves, so that movement of the trackball 20 in a particular direction in relation to the top section 14 moves the cursor in exactly the same direction. Consequently, movement of the trackball 20 correlates more intuitively to the movement of the cursor. The location of the select buttons 24, 26 behind the trackball 20 allow the user to operate the pointing device with one hand and minimum effort, reducing discomfort and fatigue.

In an alternative embodiment, the embedded trackball may be adapted to a desktop system. Referring now to FIGS. 9 and 10, a trackball 50 is embedded in the upper right-hand corner of a computer's keyboard 52. Similar to the first embodiment, select buttons 54, 56 are placed on the underside of the keyboard 52 directly behind the trackball 50. The user operates the select buttons 54, 56 by reaching under the keyboard 52 with his index and middle fingers and placing his thumb on the trackball 50. The select buttons 54, 56 are more accessible using a conventional pair of legs 58 on the underside of the keyboard 52 for propping the keyboard 52 towards the user. As in the preferred embodiment, the trackball 50 can be placed on either the left side or the right side of the keyboard 52, depending upon the user's preference.

For desktop systems, embedding the trackball 50 in the keyboard 52 offers many of the same advantages as in the portable version. With the trackball 50 on the keyboard section, all of the user input interface devices are located near the keyboard 52. A separate mouse unit, which requires space and adds to the clutter of equipment, is no longer necessary for graphics oriented applications.

The above disclosure and description of the invention are illustrative and explanatory thereof, and various changes in size, shape, materials, components, circuit elements, wiring connections and contacts, as well as in the details of the illustrated circuitry and construction, may be made without departing from the spirit of the invention.

We claim:

1. A keyboard for use with a computer system, the keyboard comprising:

a housing having a top face, a bottom face and two ends and a first opening in said top face, a second opening in said top face and a third opening in said bottom face;

a plurality of keys located in said housing and projecting through said first opening; and a user interface device located within said housing, said user interface device including:

a pointing device positioned in said second opening; and a first select button positioned in said third opening.

2. The keyboard of claim 1 wherein said pointing device is a trackball.

3. A keyboard for use with a computer system, the keyboard comprising:

a housing having a top and a bottom;

a plurality of keys positioned in the top of said housing; and a user interface device located inside said housing, said user interface device including:

a pointing device positioned in the top of said housing, and a first select button positioned in the bottom of said housing.

4. The keyboard of claim 3 wherein said pointing device is a trackball.

5. The keyboard of claim 4 wherein said housing further includes a recess formed in the top of said housing to receive said pointing device.

6. Keyboard of claim 3 wherein said housing further includes a recess formed in the top of said housing to receive said pointing device.

7. The keyboard of claim 3 wherein said pointing device does not substantially protrude beyond the top of said housing.

8. The keyboard of claim 3 wherein said first select button includes an outside surface, said outside surface does not protrude beyond the bottom of said housing.

9. The keyboard of claim 8 wherein said first select button outside surface is substantially flush with the bottom of said housing.

10. The keyboard of claim 3 wherein said housing includes a second select button positioned adjacent said first select button.

11. The keyboard of claim 10 wherein said second select button is positioned on the bottom of said housing.

12. The keyboard of claim 3 further comprising a pair of legs to support the housing.

13. The keyboard of claim 3 wherein said pointing device being positioned on either end of the front side of the keyboard.

14. A keyboard for use with a computer system having a display including a cursor, the keyboard comprising:

a housing having a top and a bottom;

a plurality of keys positioned in the top of said housing; and a user interface device located inside said housing, said user interface device including:

a pointing device positioned in the top of said housing for moving the cursor in any direction on the display, and a first select button positioned in the bottom of said housing.

15. The keyboard of claim 14 wherein said pointing device is a trackball.

16. The keyboard of claim 15 wherein said trackball moves the cursor in any direction on the display.

17. The keyboard of claim 14 wherein said housing includes a second select button positioned adjacent said first select button.

18. The keyboard of claim 14 further comprising a pair of legs to support the housing.

19. The keyboard of claim 14 wherein said pointing device being positioned on either end of the front side of the keyboard.

20. The keyboard of claim 14 wherein when said first select button is activated a program being pointed to by the pointing device is executed without moving the cursor on the display.

* * * * *

UNITED STATES PATENT AND TRADEMARK OFFICE
CERTIFICATE OF CORRECTION

PATENT NO. : 5,565,889
DATED : October 15, 1996
INVENTOR(S) : Cynthia A. Crooks, et al It is certified that error appears in the above-indentified patent and that said Letters Patent is hereby corrected as shown below:

On the title page, item [54] and column 1, substitute the title " POINTING DEVICE FOR A KEYBOARD" to —POINTING DEVICES FOR A PORTABLE COMPUTER—.

In the inventors name, item [75] "BOX" should read —CROOKS—.

Signed and Sealed this

Eleventh Day of February, 1997

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,565,889

DATED : OCTOBER 15, 1996

INVENTOR(S) : CYNTHIA A. BOX; MICHAEL W. AMBROSE; STEPHAN A. MATO, JR.; AND GOPAL C. BHAGAT

It is certified that error appears in the above-identified patent and that said Letters Patent is hereby corrected as shown below:

IN THE TITLE [54] PLEASE DELETE "POINTING DEVICES FOR A PORTABLE COMPUTER" AND ADD —POINTING DEVICE FOR A KEYBOARD—.

IN THE INVENTORS [75] PLEASE DELETE "CROOKS" AND ADD —BOX—.

This certificate supersedes Certificate of Correction issued February 11, 1997

Signed and Sealed this

Eighth Day of July, 1997

Attest:

BRUCE LEHMAN

*Attesting Officer*  *Commissioner of Patents and Trademarks*